United States Patent
Sasaki

[11] Patent Number: 6,067,345
[45] Date of Patent: May 23, 2000

[54] EMERGENCY ALARMING APPARATUS

[75] Inventor: Hironobu Sasaki, Tokyo, Japan

[73] Assignee: Oki Electric Industry Co., Ltd., Tokyo, Japan

[21] Appl. No.: 09/167,565

[22] Filed: Oct. 7, 1998

[30] Foreign Application Priority Data

Oct. 9, 1997 [JP] Japan .................................. 9-277431

[51] Int. Cl.[7] .............................................. H04M 11/00
[52] U.S. Cl. ................................................ 379/39; 379/33
[58] Field of Search ............................... 379/39, 44, 37, 379/33, 32, 1

[56] References Cited

U.S. PATENT DOCUMENTS

| | | | |
|---|---|---|---|
| 4,741,022 | 4/1988 | Chebra et al. | 379/39 |
| 4,969,178 | 11/1990 | Chen et al. | 379/33 |
| 5,062,131 | 10/1991 | Kanare et al. | 379/33 |
| 5,737,391 | 4/1998 | Dame et al. | 379/33 |
| 5,901,201 | 5/1999 | Schull | 379/33 |

*Primary Examiner*—Stella Woo
*Attorney, Agent, or Firm*—Wenderoth, Lind & Ponack, L.L.P.

[57] ABSTRACT

An emergency alarming apparatus for detecting a resistive short-circuit between a pair of telephone lines. When the continuation of a dial tone more than a predetermined time period or the generation of a busy tone is recognized but a line current is not detected, the apparatus stops the transmission of a monitor signal to the telephone lines.

3 Claims, 3 Drawing Sheets

EMERGENCY ALARMING APPARATUS

BACKGROUND OF THE INVENTION

1. Field of the Invention

The invention relates to an emergency alarming apparatus for alarming abnormality signals from abnormality detecting sensors for prevention of crimes and for prevention of disaster to a monitor center through analog telephone lines.

2. Related Background Art

According to an emergency alarming apparatus which has conventionally been known, various abnormality detecting sensors for prevention of intrusion and for prevention of disaster such as a fire and the like are provided. The apparatus is connected as a system to a monitor center through a public telephone (telephone office) exchanger. When the sensor detects an abnormality, an auto-dialing is activated, the monitor center is called through the public telephone exchanger so as to notify the abnormality information based on the detection of the sensor.

A monitor signal is always supplied from the emergency alarming apparatus to an analog telephone line (hereinafter, simply referred to as a "telephone line"). When the telephone line is disconnected or short-circuited, as a signal monitor communication service, the emergency alarming apparatus automatically calls the monitor center through the public telephone exchanger, thereby notifying thereto of the occurrence of the abnormality.

In the foregoing conventional system, however there occurs, for example, such a line-fault state such that the telephone lines are short-circuited therebetween through a certain resistance value, the public telephone exchanger recognizes the closure or short-circuit of the telephone lines but an apparatus at the public telephone exchanger detects the above-mentioned monitor signal since attenuation of this monitor signal is insufficient. When the above state continues, the public telephone exchanger usually stops a power supply to the particular telephone line and there occur such problems that even if the emergency alarming apparatus detects the abnormality and the automatic dialing is activated, the abnormality cannot be alarmed, and the monitor center side cannot detect the failure of the telephone line.

OBJECTS AND SUMMARY OF THE INVENTION

It is, therefore, a main object of the present invention to provide an emergency alarming apparatus which can detect an abnormality and notify a telephone office of abnormality information even when the telephone lines are short-circuited together through a certain resistance.

According to the invention, there is provided an emergency alarming apparatus having a telephone to be connected to a pair of telephone lines extended from a telephone exchanger, a sensor for detecting the occurrence of an abnormal state and generating an abnormality detection signal, and alarming means for transferring abnormality detection signal generation information to a monitor center through the telephone lines when the abnormality detection signal is received from said sensor, comprising: monitor signal transmitting means for transmitting a monitor signal for monitoring whether said telephone lines are normal or not; line current detecting means for detecting that a magnitude of a line current flowing through said telephone lines is equal to or larger than a predetermined value; tone detecting means for generating a tone detection signal when it detects that a tone component which is transmitted from said telephone exchanger exists on said telephone lines; and monitor signal control means for stopping the transmission of said monitor signal if said line current is not detected but the tone component is detected by said tone detecting means.

According to the invention, when tone component appears on the telephone lines it is determined whether the line current has been detected by the line current detecting means or not. Transmission of the monitor signal is continued when the line current is detected, and the transmission of the monitor signal is stopped when the line current is not detected.

DETAILED DESCRIPTION OF THE PREFERRED EMBODIMENT

Figure 1:
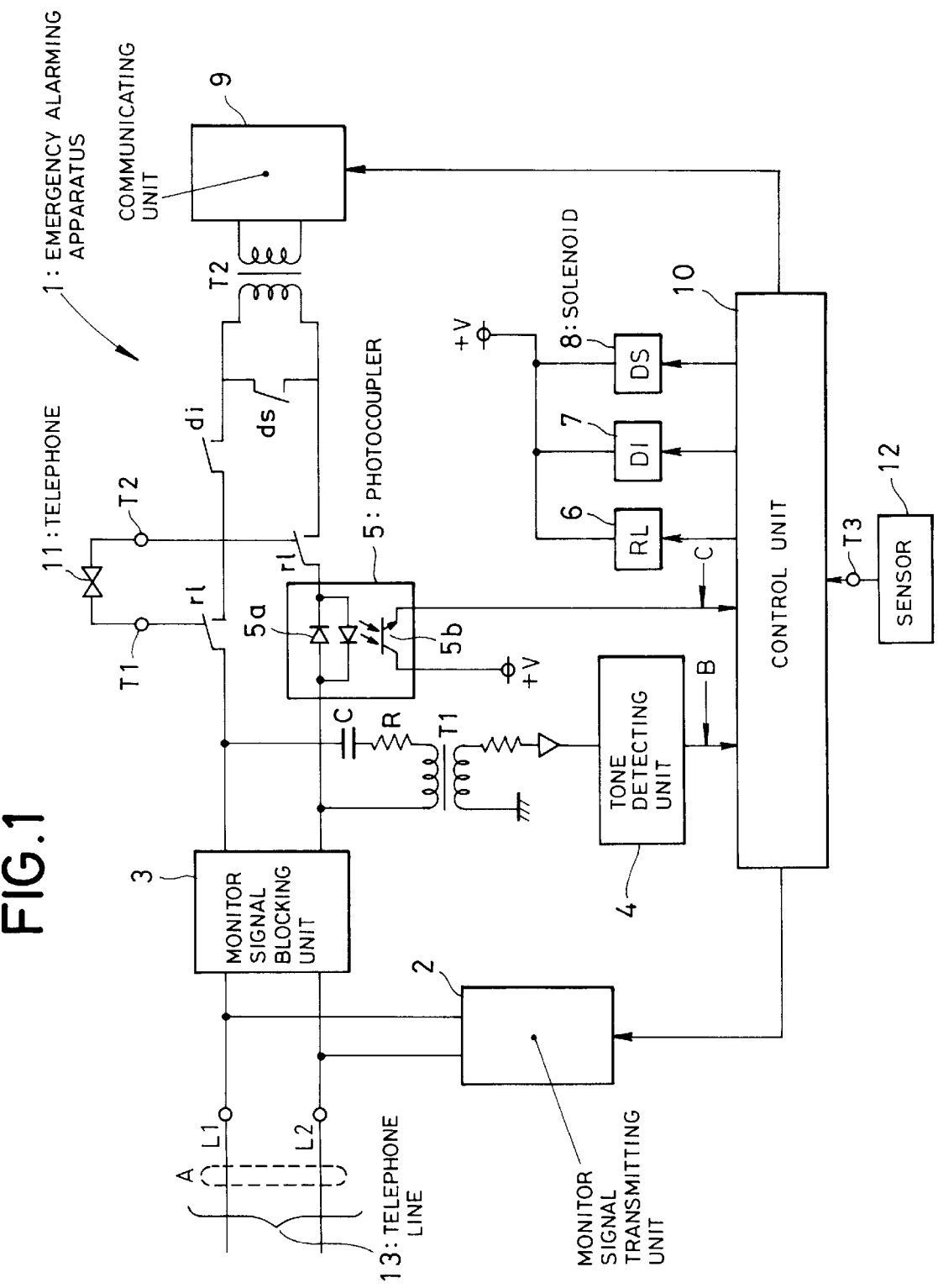
FIG. 1 is a block diagram of an emergency alarming apparatus according to the present invention.

FIG. 1 is a block diagram showing an emergency alarming apparatus according to the invention.

The emergency alarming apparatus comprises a telephone 11 and an abnormality detecting sensor 12 which are to be respectively connected thereto via terminals T1, T2 and T3. The emergency alarming apparatus 1 connected to a telephone exchanger (not shown) through a telephone line 13 and further comprises a monitor signal transmitting unit 2, a monitor signal blocking unit 3, a tone detecting unit 4, a photocoupler 5, relay solenoids 6, 7, and 8, a communicating unit 9, and a control unit 10. The abnormality detecting sensor 12 is a sensor which generates an abnormality detection signal when a cover (not shown) of a housing (not shown) surrounding or covering the emergency alarming apparatus 1 is opened. The sensor further generates the abnormality detection signal when there is a fire, a gas leakage, or an intrusion has occurred in a house or building equipped with the emergency alarming apparatus 1.

The monitor signal transmitting unit 2 usually continuously transmits a monitor signal of a predetermined frequency of, for instance, 8 kHz. When it receives a transmission stop command from the control unit 10, the monitor signal transmitting unit 2 stops the transmission of the monitor signal. The monitor signal blocking unit 3 prevents the monitor signal issued from the monitor signal transmitting unit 2 from being supplied to the telephone 11 and also allows only a signal in an audio band to pass therethrough bidirectionally. The tone detecting unit 4 monitors a tone component appearing between lines L1 and L2 of the telephone line 13 through a high impedance by a transformer T1, a resistor R, and a capacitor C, and detects the tone component of 400 Hz such as a dial tone or a busy tone, and transmits a tone detection signal to the control unit 10 upoon its detection.

The photocoupler 5 is constructed by a pair of light emitting diodes 5a mutually arranged in the opposite directions and a phototransistor 5b which is turned on when either of the light emitting diodes 5a emits a light beam. When a line current flowing through the telephone lines because of an off-hook condition of the telephone 11 is larger in magnitude than a predetermined value, the photocoupler 5 transmits a signal (+V) to the control unit 10.

The relay solenoid 6 corresponds to relay contacts rl for switching from a speech communication by the telephone 11 to an emergency alarm by the emergency alarming apparatus 1 and vice versa. The relay solenoid 7 corresponds to a relay contact di which is opened or closed upon dial activation by the emergency alarm. The relay solenoid 8 corresponds to a contact ds which is closed at the time of the dial activation by the emergency alarm. The relay solenoids 6, 7, and 8 make the corresponding contacts rl, di, and ds open/close on the basis of the control of the control unit 10, respectively. Such states of the respective contacts rl, di, and ds as shown in FIG. 1 correspond to states where the emergency alarming apparatus 1 does not operate. In case of an emergency alarm, the communicating unit 9 activates the dial on the basis of the control from the control unit 10, calls a monitor center (not shown) through a public telephone exchanger (not shown), transmits the abnormality information recognized by the control unit 10 to the monitor center through the telephone line, and transmits and receives the signal to/from the monitor center.

The control unit 10 monitors each signal from the tone detecting unit 4, photocoupler 5, and sensor 12. When the dial tone and the line current are recognized through the tone detecting unit and photocoupler 5, the control unit 10 determines that the speech communication by the telephone 11 has been started. When the abnormality detection signal from the sensor 12 is received, the control unit 10 drives the relay solenoids 6, 7, and 8, respectively, so as to cause the corresponding contacts rl, di, and ds to be actuated and, instructs the communicating unit 9 to execute the dialing operation, and instructs the communicating unit 9 to transmit the detection information signal from the sensor 12 through the telephone line 13.

The control unit 10 has monitor signal control means. When the dial tone or busy tone is recognized while the line current is not recognized, the monitor signal control means generates a stop command of the transmission of the monitor signal to the monitor signal transmitting unit 2.

The operation will now be described with reference to time charts shown in FIGS. 2A to 2E. FIGS. 2A to 2E are the time charts of various signals when the lines L1 and L2 of the telephone line are short-circuited together at, for example, a portion A shown in FIG. 1 through a certain resistance value. This expression of "a certain resistance value" denotes such a resistance value that the public telephone exchanger can recognize the closure of the line and the apparatus on the exchanger side can detect the monitor signal transmitted from the emergency alarming apparatus.

Figure 2A:
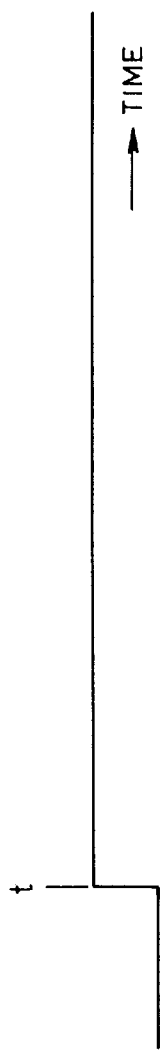
FIGS. 2A to 2E are time charts showing changes in magnitude of various signals when telephone lines L1 and L2 to which the emergency alarming apparatus of FIG. 1 is connected is short-circuited by a relatively low resistance value.
Figure 2B:
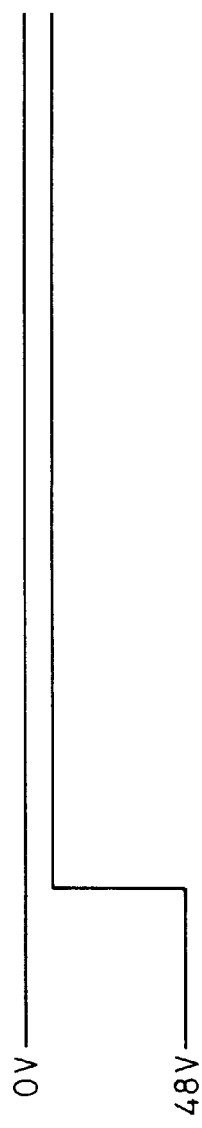
Figure 2C:
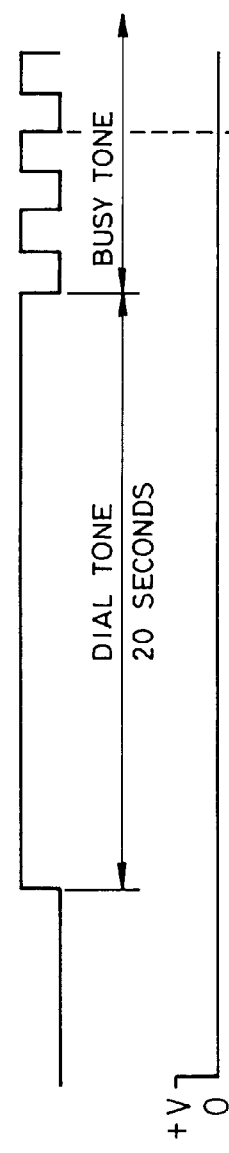

When, at a time t in FIG. 2A, the lines L1 and L2 are assumed to be short-circuited by the resistance of the value as mentioned above, an electric potential (a rated value: −48V) across the lines in the emergency alarming apparatus 1 extremely drops (refer to FIG. 2B). In this instance, the public telephone exchanger recognizes the closure of the line by the short-circuit between the lines and supplies a dial tone (single tone of 400 Hz) to the emergency alarming apparatus 1 through the telephone line 13. Since, however, the activation is not the activation by the hook-up of the telephone, in this case, no dial information is supplied to a register (not shown) of the public telephone exchanger. The public telephone exchanger, therefore, transmits a busy tone (intermittence of the single tone of 400 Hz) to the telephone line 13 after the elapse of, for example, 20 seconds after the dial tone had been transmitted (refer to FIG. 2C).

Figure 2D:
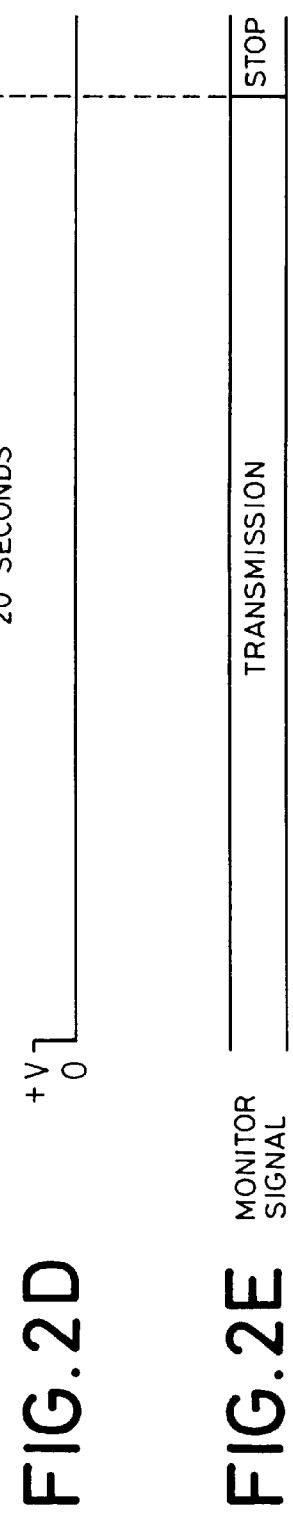
Figure 2E:
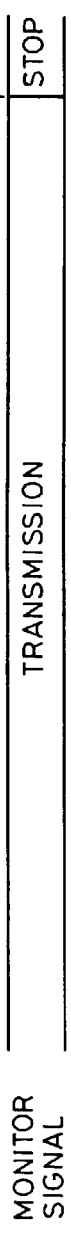

Since, in this case, the short-circuit point (the portion A in FIG. 1) exists on the line side, no line current flows, a detection output C of the photocoupler 5 of the emergency alarming apparatus 1 is held zero (refer to FIG. 2D). The tone detecting unit 4 transmits a detection signal B of the dial tone or busy tone to the control unit 10. The control unit 10 recognizes the dial tone because of the signal B and, thereafter, recognizes the busy tone. When, in this instance, the existence of the line current is recognized on the basis of the detection output from the photocoupler 5, the control unit 10 determines the off-hook condition of the telephone 11, so that the control unit 10 does not issue any command. When, however, it does not recognize the existence of the line current by the detection output C from the photocoupler 5 even under the condition of the existence of the tone signal on the telephone line, the control unit generates a transmission stop command of the monitor signal to the monitor signal transmitting unit 2. When the stop command is received, the monitor signal transmitting unit 2 stops such operation to transmit the monitor signal to the telephone line 13 (refer to FIG. 2E).

Figure 3:
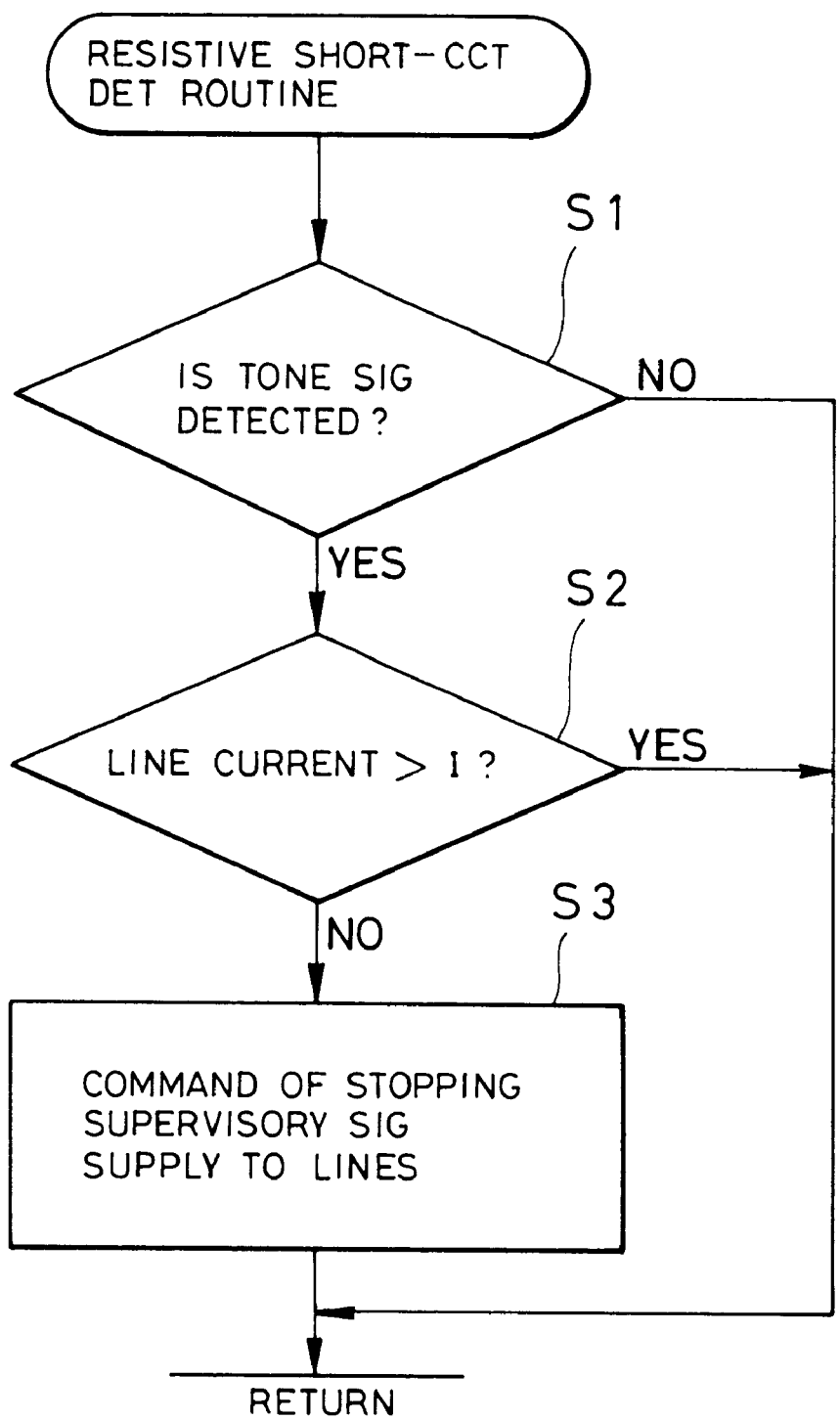
FIG. 3 is a flow-chart showing a routine performed by the apparatus according to the present invention.

It is to be noted that the control unit 10 may be constituted by a microprocessor and performs such a resistive short circuit detection routine as shown in FIG. 3, so as to accomplish the above-mentioned operation. When, as mentioned above, the abnormality detection signal is received from the sensor 12, the control unit 10 monitors the line current and the tone signal (step S1 and S2). When only the tone signal is detected without detecting the line current, the control unit stops the transmission of the monitor signal (step S3), so that the monitor center side can immediately detect the abnormality of the telephone line 13 to which the emergency alarming apparatus is connected. Therefore, such a situation can be avoided that the emergency alarming apparatus 1 cannot transmit the abnormality detection information from the sensor 12 to the monitor center side for a long time. A signal monitor communication service of higher reliability can be provided to the user side.

In such operation where the control unit 10 receives the abnormality detection signal from the sensor 12, the tone signal can be detected by the detection of the dial tone of a predetermined time period or by the detection of the busy tone by the continuation of a predetermined number or more of the tone signal.

In case of detecting the tone signal by the detection of the dial tone, the tone signal detection can be rapidly performed since the apparatus does not wait for the busy tone.

In the foregoing embodiment, a line failure is transmitted to the monitor center (by stopping the transmission of the monitor signal) by using the signal monitor communication service. It is, however, possible to add another telephone line and an interface circuit to the emergency alarming apparatus 1 and to notify the monitor center of the occurrence of the line failure through the particular telephone line by using a data transmission technique.

According to the invention as mentioned above, the emergency alarm apparatus monitors the line current and the line tone. When the generation of the dial tone or busy tone of the predetermined time or more is recognized but the line current is not detected, the transmission of the monitor signal is stopped, so that the monitor center side can immediately detect the abnormality of the telephone line of the subscriber, that is, the emergency alarm apparatus. The continuation, consequently, of the situation such that the emergency alarming apparatus cannot inform the monitor center side of the abnormality from the sensor for a long time can be prevented. An emergency alarming apparatus with a higher reliability is provided according to the invention.

What is claimed is:

1. An emergency alarming apparatus having a telephone to be connected to a pair of telephone lines extended from a telephone exchanger, a sensor for detecting the occurrence of an abnormal state and generating an abnormality detection signal, and alarming means for transferring abnormality detection signal generation information to a monitor center through the telephone lines when the abnormality detection signal is received from said sensor, comprising:

monitor signal transmitting means for transmitting a monitor signal representing whether the telephone lines are normal or not;

line current detecting means for detecting that a magnitude of a line current flowing through the telephone lines is equal to or larger than a predetermined value;

tone detecting means for generating a tone detection signal when said tone detecting means detects that a tone component which is transmitted from the telephone exchanger exists on the telephone lines; and monitor signal control means for stopping the transmission of the monitor signal if the line current is not detected by said line current detecting means but the tone component is detected by said tone detecting means.

2. An apparatus according to claim 1, wherein said tone detecting means generates the tone detection signal when said tone detecting means detects that the tone component continuously exists during a predetermined time period.

3. An apparatus according to claim 1, wherein said tone detecting means generates the tone detection signal when said tone detecting means repeatedly detects the tone component more than a predetermined number of times.

* * * * *